United States Patent [19]

Masui

[11] Patent Number: 5,426,733
[45] Date of Patent: Jun. 20, 1995

[54] IMAGE ROTATION APPARATUS CAPABLE OF ROTATING IMAGE DATA OF DIFFERENT NUMBERS OF PIXEL BITS

[75] Inventor: Takanori Masui, Ebina, Japan

[73] Assignee: Fuji Xerox Co., Ltd., Tokyo, Japan

[21] Appl. No.: 95,521

[22] Filed: Jul. 26, 1993

[30] Foreign Application Priority Data

Jul. 27, 1992 [JP] Japan .................. 4-199810

[51] Int. Cl.$^6$ .......................... G06F 12/06
[52] U.S. Cl. .................. 395/166; 395/164; 395/137; 382/297
[58] Field of Search ............ 395/137, 162–166; 345/121, 126, 185, 201; 382/44, 46

[56] References Cited

U.S. PATENT DOCUMENTS

| | | | |
|---|---|---|---|
| 4,929,085 | 5/1990 | Kajihara | 382/46 |
| 5,067,167 | 11/1991 | Berger | 382/46 |
| 5,111,192 | 5/1992 | Kadakia | 345/126 |
| 5,295,245 | 3/1994 | Alcorn et al. | 395/164 |

FOREIGN PATENT DOCUMENTS

| | | |
|---|---|---|
| 60-81657 | 5/1985 | Japan . |
| 60-83153 | 5/1985 | Japan . |
| 62-236080 | 10/1987 | Japan .................. G06F 3/14 |

*Primary Examiner*—Mark R. Powell
*Assistant Examiner*—Kee M. Tung
*Attorney, Agent, or Firm*—Finnegan, Henderson Farabow, Garrett & Dunner

[57] ABSTRACT

Input image data of N bits per pixel is written to and read from buffer memories each having a word length of B bits on a W/N-line basis in the order in accordance with a specified rotation angle and an image size. A word synthesizing circuit synthesizes B/N word data of W bits from W/N readout image data having a word length of B bits so as to produce image data rotated by the specified rotation angle. The synthesized word data are output in the order in accordance with the specified rotation angle while write addresses are generated to store the input image data into a page memory having a word length of W bits with a rotation of the specified rotation angle.

14 Claims, 14 Drawing Sheets

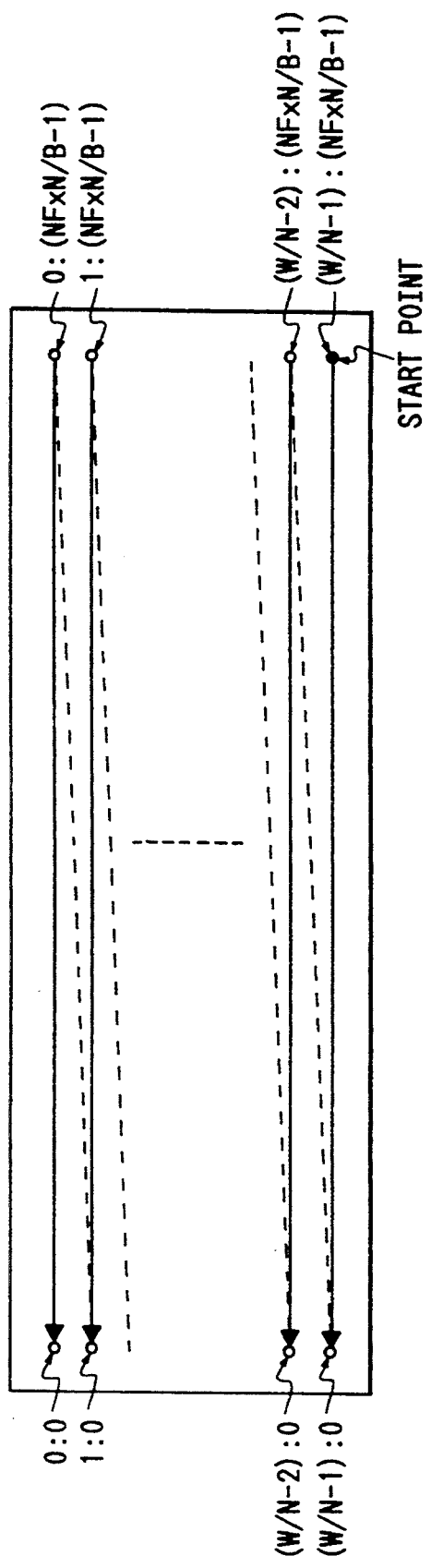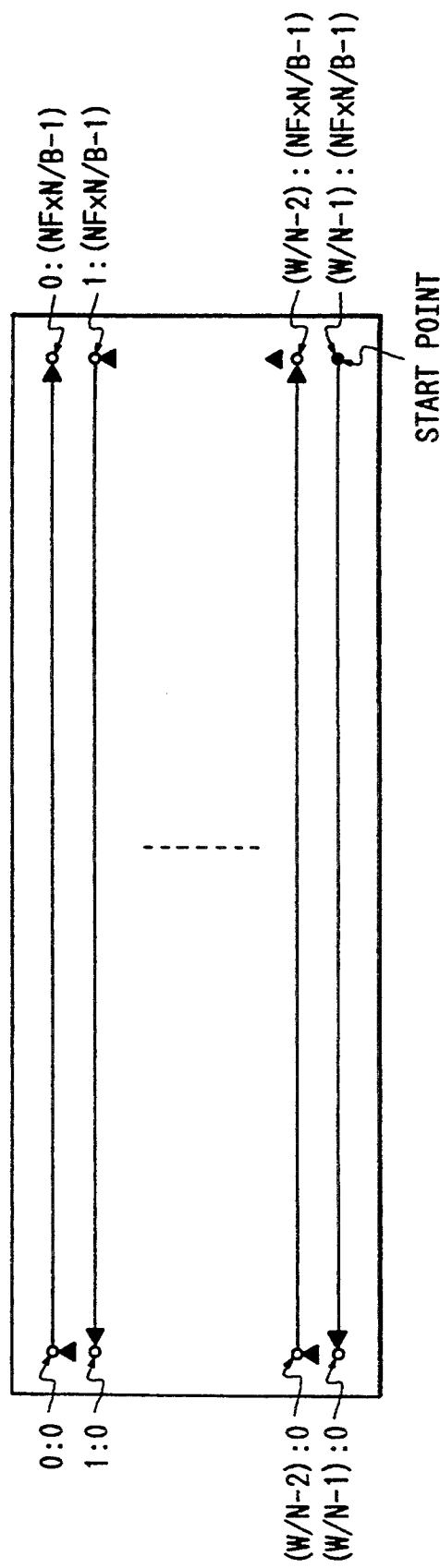

| TIME | INPUT DATA | RA1 | RA2 | RA3 | RA4 | RB1 | RB2 | RB3 | RB4 |
|---|---|---|---|---|---|---|---|---|---|
| 1 | D0, D1 | D0 | D1 | | | | | | |
| 2 | D2, D3 | D0 | D1 | D2 | | | | | |
| 3 | D4, D5 | D0 | D1 | D2 | D3 | D4 | D5 | | |
| 4 | D6, D7 | D0 | D1 | D2 | D3 | D4 | D5 | D6 | D7 |

202

| TIME | INPUT DATA | RA1 | RA2 | RA3 | RA4 | RB1 | RB2 | RB3 | RB4 |
|---|---|---|---|---|---|---|---|---|---|
| 1 | D0, D1 | | | | | | | | |
| 2 | D2, D3 | | D2 | D1 | D0 | | | | |
| 3 | D4, D5 | D3 | D2 | D1 | D0 | | D5 | | D4 |
| 4 | D6, D7 | D3 | D2 | D1 | D0 | D7 | D6 | D5 | D4 |

| TIME | INPUT DATA | RA1 | RA2 | RA3 | RA4 | RB1 | RB2 | RB3 | RB4 |
|---|---|---|---|---|---|---|---|---|---|
| 1 | D0, D1 | D0 | | | | D1 | | | |
| 2 | D2, D3 | D0 | D2 | | | D1 | D3 | | |
| 3 | D4, D5 | D0 | D2 | D4 | | D1 | D3 | D5 | |
| 4 | D6, D7 | D0 | D2 | D4 | D6 | D1 | D3 | D5 | D7 |

204

| TIME | INPUT DATA | RA1 | RA2 | RA3 | RA4 | RB1 | RB2 | RB3 | RB4 |
|---|---|---|---|---|---|---|---|---|---|
| 1 | D0, D1 | | | | D0 | | | | D1 |
| 2 | D2, D3 | | | D2 | D0 | | | D3 | D1 |
| 3 | D4, D5 | | D4 | D2 | D0 | | D5 | D3 | D1 |
| 4 | D6, D7 | D6 | D4 | D2 | D0 | D7 | D5 | D3 | D1 |

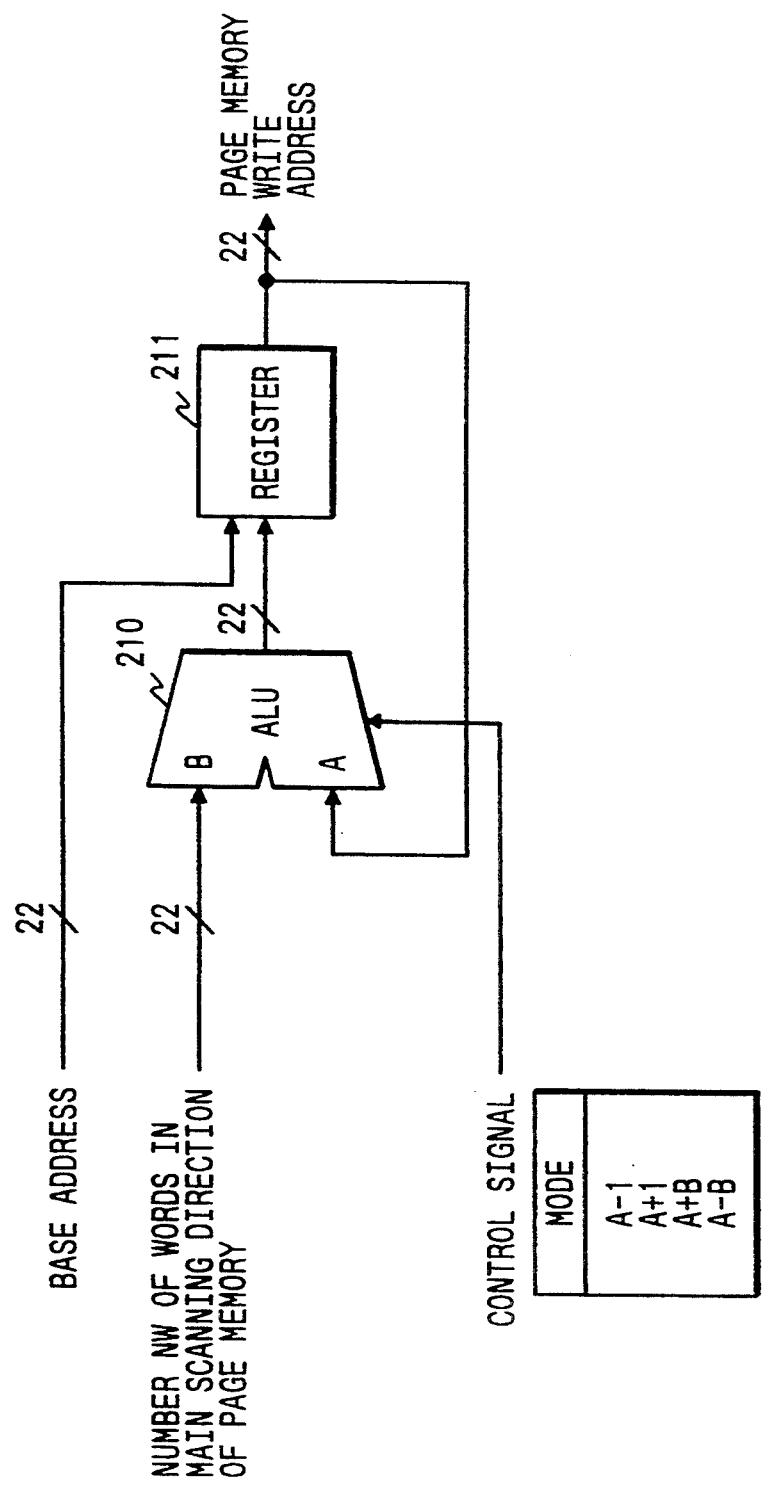

5,426,733

IMAGE ROTATION APPARATUS CAPABLE OF ROTATING IMAGE DATA OF DIFFERENT NUMBERS OF PIXEL BITS

BACKGROUND OF THE INVENTION

The present invention relates to an image rotation apparatus which rotates, at high speed, an input image by an angle integer multiple of 90° and stores the rotated image into a page memory, and which can accommodate input image data of different numbers of information bits of one pixel.

In image processing apparatuses, the number of density gradation levels of a pixel is determined by the number of information bits of the pixel. For example, a 2-gradation, black-and-white image is reproduced if the number of information bits is one, and a 4-gradation, light and shade image is reproduced if it is two. Although in general the number of information bits is fixed, it may be the case that the number of information bits is changed in the same image processing apparatus in accordance with the purpose of image processing. For example, the number of information bits is set at one when binary, black-and-white image data is processed, and it is increased when halftone image data is processed. The image processing apparatus is required to be able to perform image rotation for image data of difference numbers of information bits of one pixel.

Japanese Patent Application Unexamined Publication No. Sho. 60-81657 discloses a data control technique in an image rotation apparatus in which memory address control is performed by count increase/decrease control of counters. According to this technique, no problem occurs when the number of information bits of one pixel is fixed. However, when there are different numbers of information bits, a plurality of address control means need to be provided for the respective numbers of information bits, which results in a complicated apparatus. Further, In the case of input image data of different numbers of information bits, the image rotation cannot be performed only by the count increase/decrease control of the counters. In addition, image data supplied from a scanner etc. cannot be rotated and stored into a page memory on a realtime basis.

Japanese Patent Application Unexamined Publication No. Sho. 60-83153 discloses a data storage apparatus which rotates, at high speed, an image of an N×N-bit block by cyclic shifting. However, since in this apparatus the image data is required to be input on a block-by-block basis, one-page image data cannot be rotated at high speed such that a plurality of blocks are rotated together.

SUMMARY OF THE INVENTION

An object of the present invention is to provide an image rotation apparatus which can rotate, with simple constitution, input image data of different numbers of information bits of one pixel, for instance, both of a binary image (the number N of information bits is one) and a multigradation image (N≧2).

Another object of the invention is to provide an image rotation apparatus which can store an input image from a scanner etc. into a page memory on a realtime basis after rotating it.

A further object of the invention is to provide an image rotation apparatus which can be constructed by using relatively low-speed memory devices, to make the apparatus compact, of low costs and of low power consumption.

According to the invention, an image rotation apparatus for rotating input image data of N bits per pixel by a specified rotation angle and storing the rotated image data to a page memory having a word length of W bits, comprises:

a buffer memory having a word length of B bits, for storing the input image data of at least W/N lines;

memory control means for writing and reading the input image data to and from the buffer memory in an order in accordance with the specified rotation angle and an image size;

means for synthesizing B/N word data of W bits from W/N image data having a word length of B bits read by the memory control means so as to produce image data rotated by the specified rotation angle;

output control means for outputting the B/N synthesized word data of W bits in an order in accordance with the specified rotation angle; and means for generating write addresses for storage of the output word data into the page memory so that the input image data is stored into the page memory with a rotation of the specified rotation angle;

where N≦B≦W, W mod B=0, and B mod N=0.

BRIEF DESCRIPTION OF THE DRAWINGS

FIG. 10 illustrates an order in which write addresses are generated by the buffer memory write address generation circuit;

FIG. 11 illustrates an order in which read addresses are generated by the buffer memory read address generation circuit for the rotation angle of 0° or 180°;

FIG. 17 and 18 show an operation of the first word synthesizing circuit;

FIG. 19 is a block diagram showing constitution of page memory write address generation circuit.

DESCRIPTION OF THE PREFERRED EMBODIMENT

An embodiment of the present invention is described below in detail with reference to the accompanying drawings.

An image rotation apparatus of the embodiment enables rotation of an input image in which the number N of information bits of one pixel is one or two. It is assumed that a word length B of a buffer memory is 4 bits and a word length W of a page memory is 8 bits.

Figure 1:
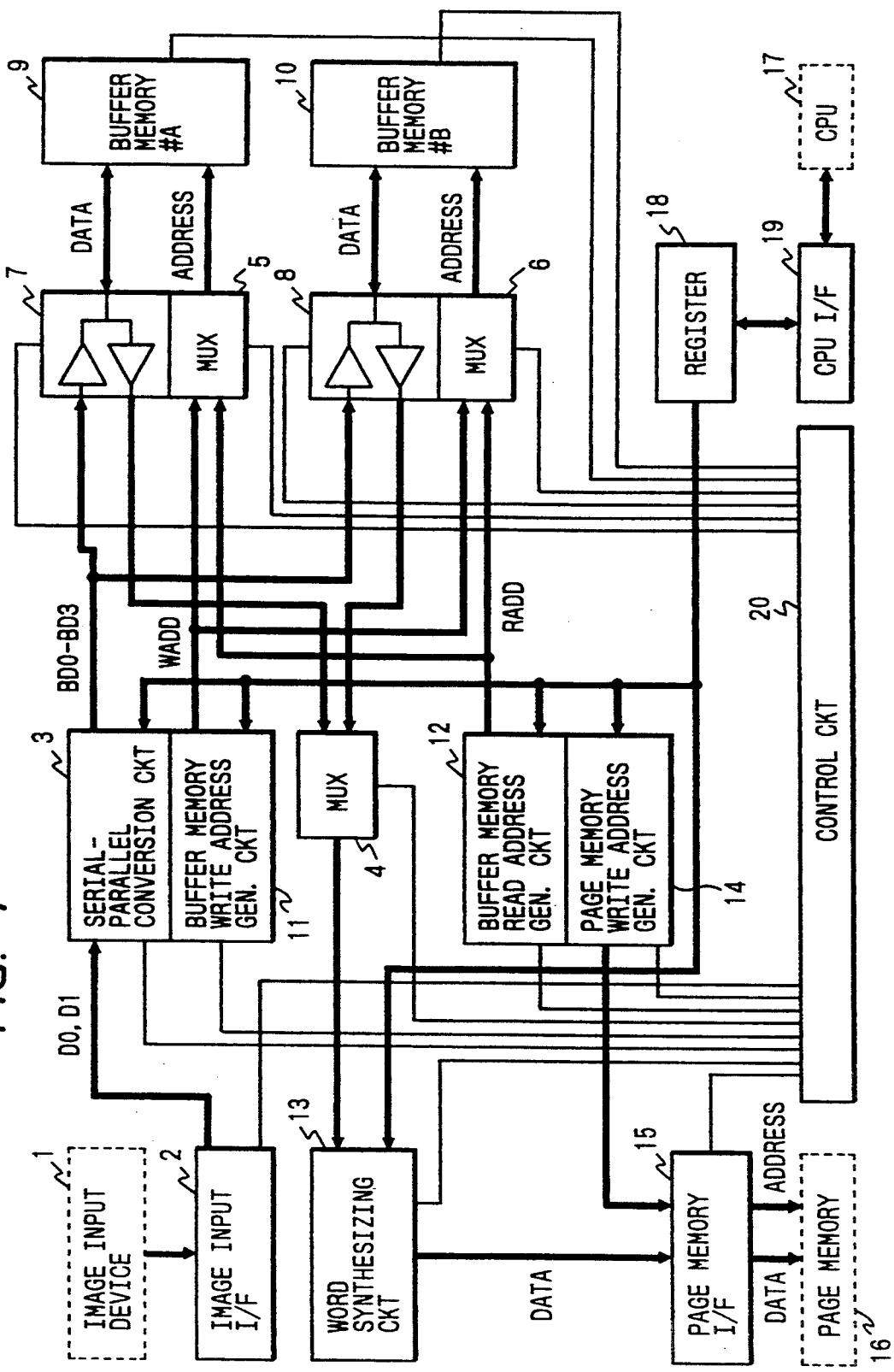
FIG. 1 is a block diagram showing constitution of an image rotation apparatus according to an embodiment of the present invention.

FIG. 1 is a block diagram showing constitution of the image rotation apparatus of the embodiment. An image input device 1 inputs an image to the image rotation apparatus. That is, the image input device 1 raster-outputs image data in synchronism with a video clock signal, together with control signals such as a line sync signal and a page sync signal. An image input interface 2 serves to receive the image data from the image input device 1. That is, the image input interface 2 extracts only the effective part of the image data using the control signals such as the page sync signal and the line sync signal. A serial-parallel conversion circuit 3 produces B-bit parallel data by combining, every B/N pixels, a set of N-bit pixel data from the image data that is in synchronism with the video clock signal. Each of multiplexers 4, 5 and 6 selectively outputs one of two input data in accordance with a control signal. Bi-directional buffers 7 and 8 forward the 3 image data output from the serial-parallel conversion circuit to buffer memories 9 and 10, respectively, and forward the image data read out from the buffer memories 9 and 10 to the multiplexer 4, respectively. Each of the buffer memory #A (9) and the buffer memory #B (10) temporarily stores the input image, and constituted of a memory element such as a SRAM. A buffer memory write address generation circuit 11 generates an address for image data writing to the buffer memory #A (9) or buffer memory #B (10). A buffer memory read address generation circuit 12 generates an address for image data reading from the buffer memory #A (9) or buffer memory #B (10). A word synthesizing circuit 13 synthesizes words of W bits so as to generate a rotated image from the image data read out from the buffer memory #A (9) or #B (10) in a predetermined order. A page memory write address generation circuit 14 generates a write address for a page memory 16 for the image data synthesized by the word synthesizing circuit 13 so that the input image is stored in the page memory 16 after being subjected to a desired rotation. A page memory interface 15 outputs the image data and an address while handshaking with the page memory 16, to write the image data to the page memory 16. The page memory 16 stores the input image as rotated by the image rotation apparatus. A CPU 17 performs, on the image rotation apparatus, such operations as setting a rotation angle, an input image size and the number of information bits of one pixel belonging to the input image, and initiating the rotation operation. A register 18 stores the data set by the CPU 17, i.e., the rotation angle, input image size and number of information bits of one pixel of the input image. A CPU interface 19 interfaces between the CPU 17 and the image rotation apparatus. A control circuit 20 performs total control of the image rotation apparatus, that is, monitors the states of the respective blocks and controls those.

The operation of the image rotation apparatus is described below according to its progress. The image data received by the image input interface 2 is input to the serial-parallel conversion circuit 3.

Figure 2:
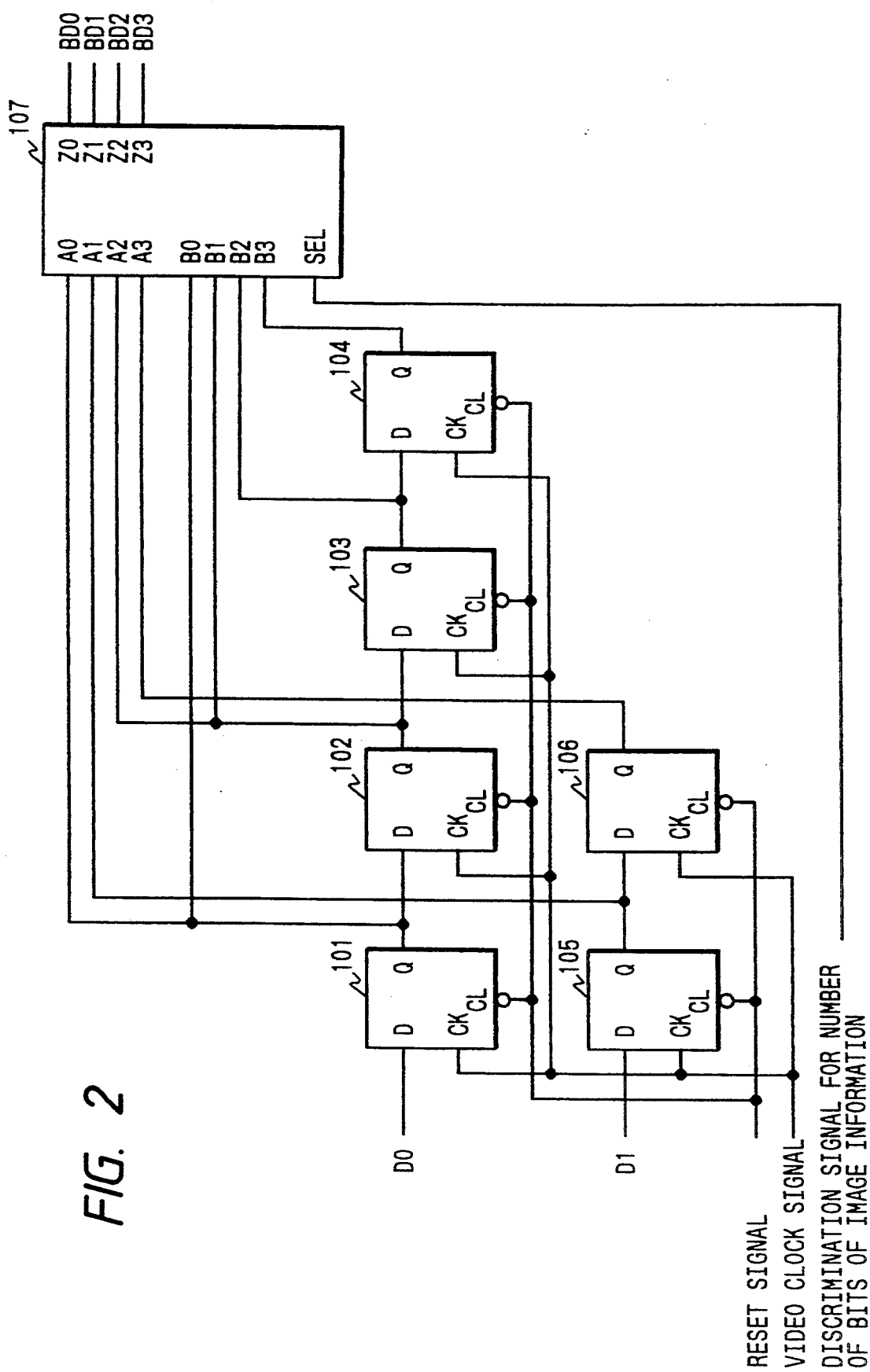
FIG. 2 is a circuit diagram of a serial-parallel conversion circuit.

FIG. 2 is a circuit diagram showing the serial-parallel conversion circuit 3, which is constituted of D-flip-flops 101–106 and a multiplexer 107 for selecting between two 4-bit input data. Prior to the start of the rotation operation, a reset signal is asserted and the D-flip-flops 101–106 are initialized. Then, the image data, which is input together with the video clock signal, is applied to both of data signal lines D0 and D1 in synchronism with the video clock signal when the number N of information bits of the input image is two. When N=1, the image data is applied only to the data signal line D0 in synchronism with the video clock signal. The image data is converted to 4-bit parallel data every two pixels when N=2, and every four pixels when N=1.

The image data of W/N lines as parallel-converted by the serial-parallel conversion circuit 3 is written to the buffer memory #A (9) in accordance with the addresses generated by the buffer memory write address generation circuit 11. Then the image data of the next W/N lines is written to the buffer memory #B (10) in accordance with the addresses generated by the buffer memory write address generation circuit 11. At the same time, the data that has been written to the buffer memory #A (9) just before is read out in accordance with the addresses generated by the buffer memory read address generation circuit 12. In this manner, the image data continues to be written to and read from the buffer memories #A (9) and #B (10) alternately on a W/N-line basis. That is, the buffer memories #A (9) and #B (10) operate like ping-pong buffers.

Figure 3:
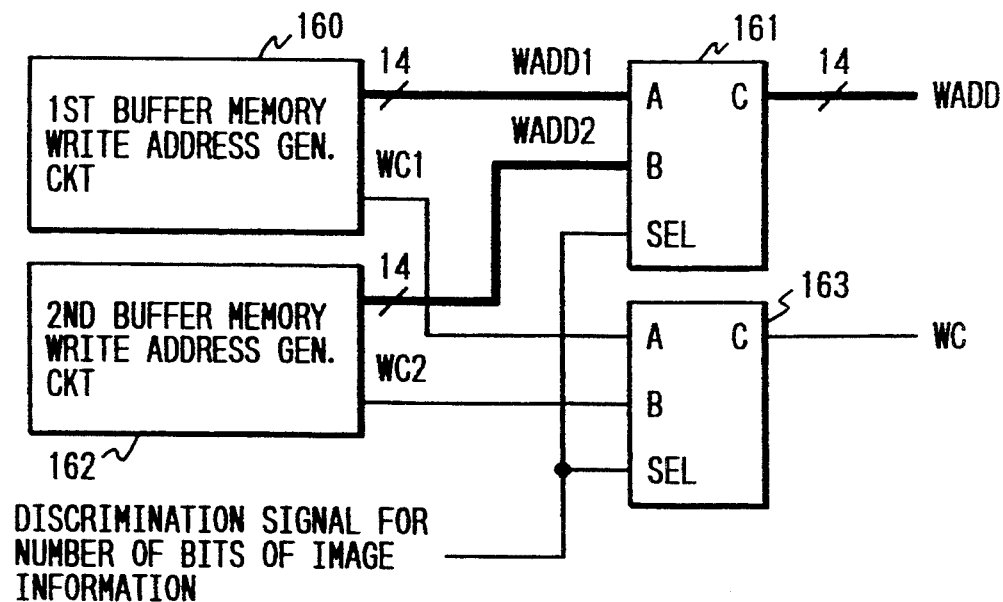
FIG. 3 is a block diagram showing constitution of a buffer memory write address generation circuit.

FIG. 3 shows the buffer memory write address generation circuit 11. A first buffer memory write address generation circuit 160 is for the input image data of N=2, and a second buffer memory write address generation circuit 162 is for the input image data of N=1. The data write addresses are switched by a multiplexer 161 in accordance with a discrimination signal for the number of bits of image information. Write completion signals WC are also switched by a multiplexer 163 in accordance with the same discrimination signal.

Figure 4:
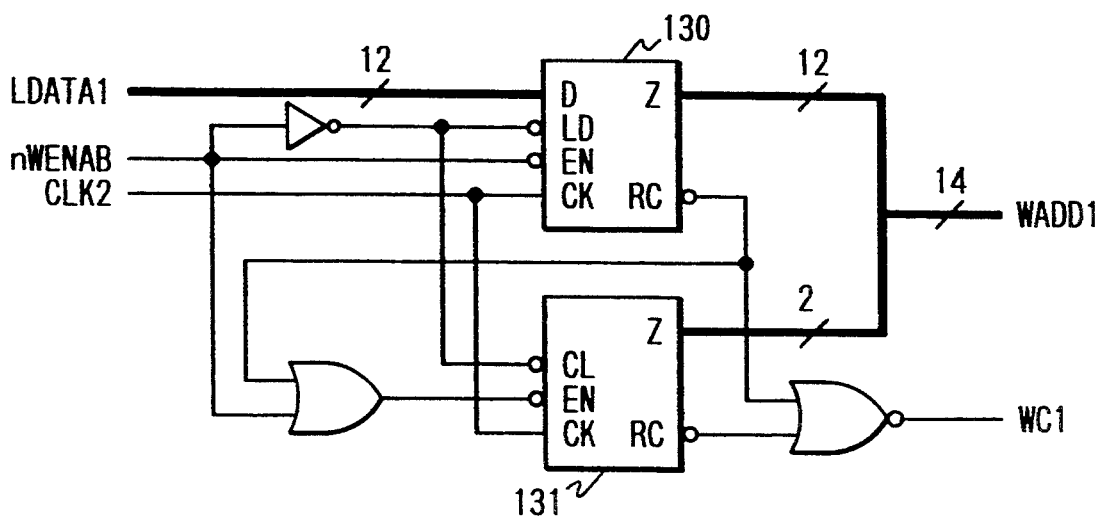
FIG. 4 is a circuit diagram of a first buffer memory write address generation circuit.

FIG. 4 shows details of the first buffer memory write address generation circuit 160. Signals LDATA1 and LDATA2 respectively indicate NF/2−1 and NF/4−1 that have been obtained by the CPU 17 by calculating NF/B×N−1 (NF is the number of pixels in the main scanning direction) for the respective values of N, and set in the register 18 as the input image size. The signal LDATA1 is input to a 12-bit loadable down counter 130. CLK2 represents a clock signal obtained having a frequency that is ½ of that of the video clock signal. Numeral 131 represents a 2-bit down counter. WADD1 represents a write address generated by the first buffer memory write address generation circuit 160, and WC1 represents its write completion signal.

Figure 5:
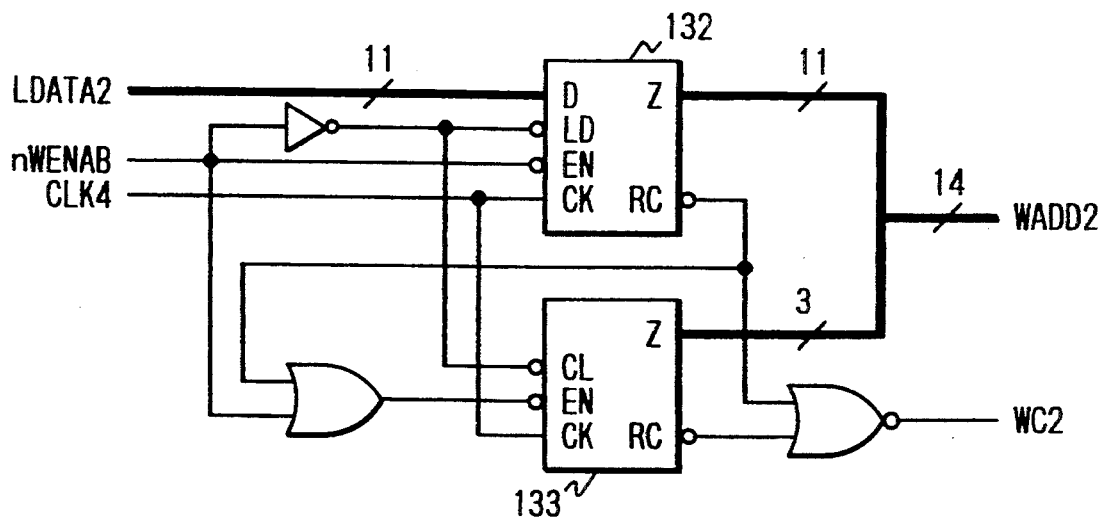
FIG. 5 is a circuit diagram of a second buffer memory write address generation circuit.

FIG. 5 shows details of the second buffer memory write address generation circuit 162. The above-mentioned signal LDATA2 is input to a 11-bit loadable sown counter 132. CLK4 is a clock signal having a frequency that is ¼ of that of the video clock signal. Numeral 133 represents a 3-bit down counter. WADD2 represents a write address generated by the second buffer memory write address generation circuit 162, and WC2 represents its write completion signal.

Figure 6:
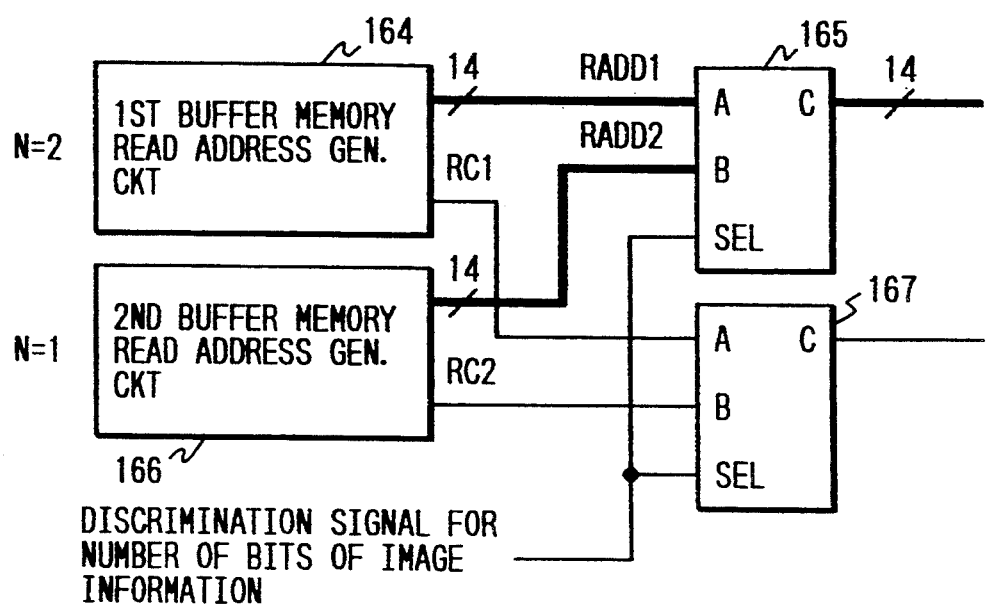
FIG. 6 is a block diagram showing constitution of a buffer memory read address generation circuit.

FIG. 6 shows the buffer memory read address generation circuit 12. A first buffer memory read address generation circuit 164 generates a read address for the buffer memory for the input image data of N=2, and a second buffer memory write address generation circuit 166 generates a read address for the buffer memory for the input image data of N=1. The data read addresses are switched by a multiplexer 165 in accordance with the discrimination signal for the number of bits of image information. Read completion signals RC are also switched by a multiplexer 167 in accordance with the same discrimination signal.

The buffer memory data read address is controlled in accordance with the rotation angle and which of the buffer memories #A (9) and #B (10) is to be subjected to the reading.

Figure 7:
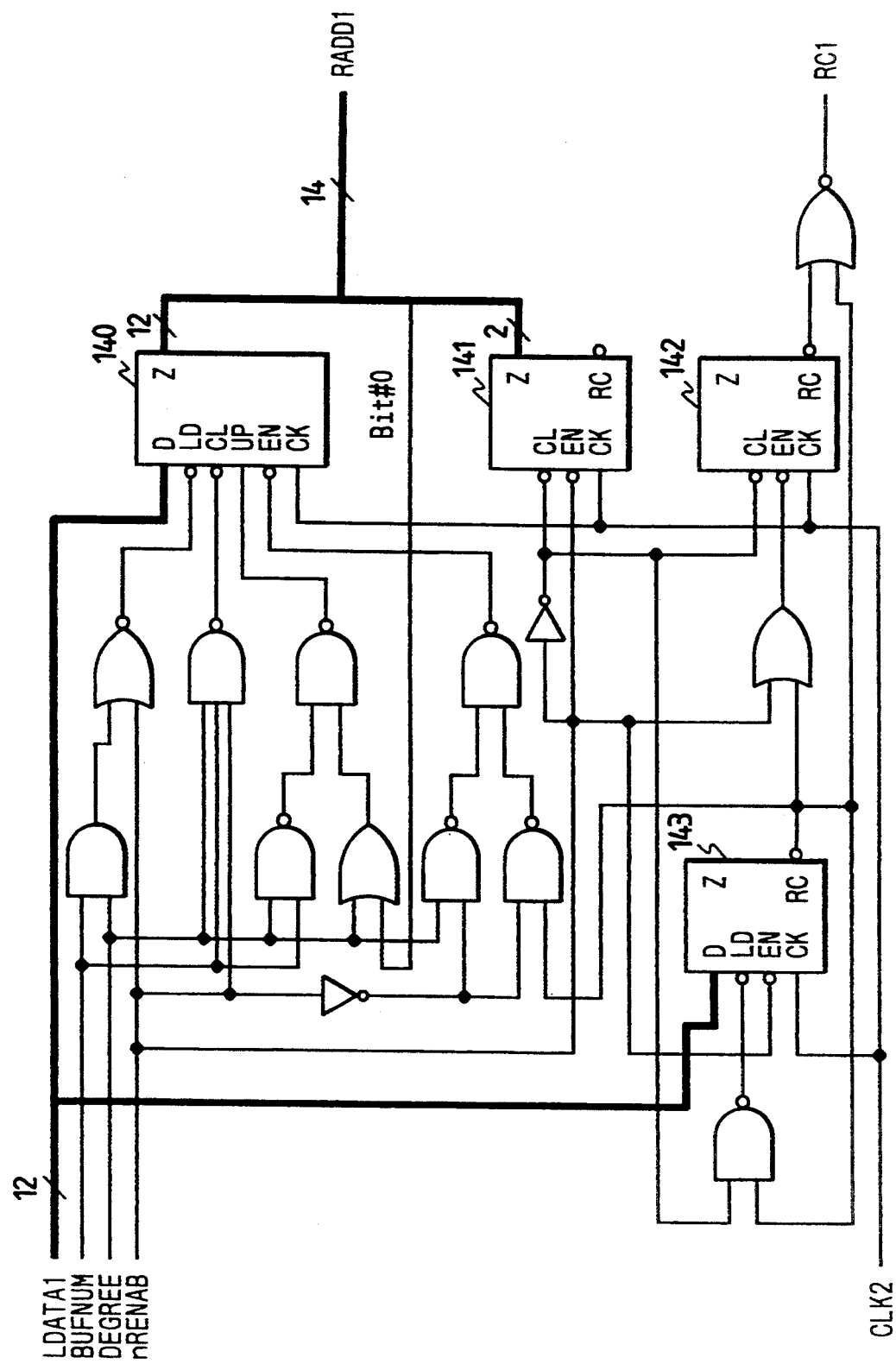
FIG. 7 is a circuit diagram of a first buffer memory read address generation circuit.

FIG. 7 shows details of the first buffer memory read address generation circuit 164. Reference numeral 140 represents a 12-bit loadable up/down counter; 141 and 142, 2-bit down counter; and 143, a 12-bit down counter. The counters 142 and 143 count the number of readout image data (i.e., the number of generated addresses), and the counters 140 and 141 generate a read address. Input signals are as follows. The signal LDATA1 indicates the value NF/2−1 stored in the register 18. A signal DEGREE indicates the rotation angle stored in the register 18, and takes a value L when the rotation angle is 0° or 180°, and a value H when it is 90° or 270°. A signal BUFNUM takes a value L when the buffer memory to be subjected to the reading is the buffer memory #A (9), and a value H when it is the buffer memory #B (10). Other input signals are a read enable signal nRENAB that is supplied from the control circuit 20, and the clock signal CLK2 having a frequency that is ½ of that of the video clock signal.

Figure 8:
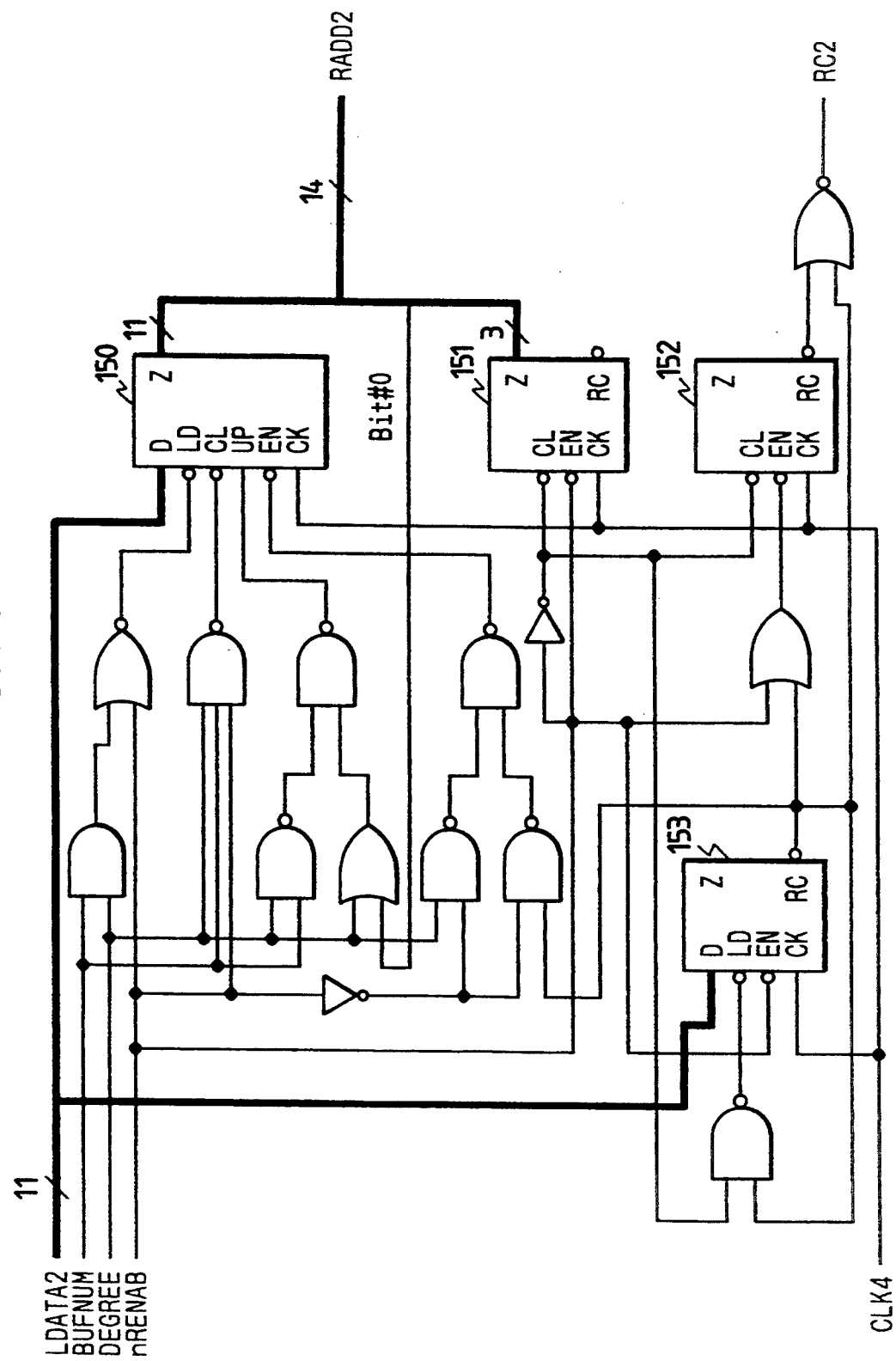
FIG. 8 is a circuit diagram of a second buffer memory read address generation circuit.

FIG. 8 shows details of the second buffer memory read address generation circuit 166. Reference numeral 150 represents a 11-bit loadable up/down counter; 151 and 152, 3-bit down counter; and 153, a 11-bit down counter. The counters 152 and 153 count the number of readout image data (i.e., the number of generated addresses), and the counters 150 and 151 generate a read address. Input signals are as follows. The signal LDATA2 indicates the value NF/4−1 stored in the register 18. The signal DEGREE indicates the rotation angle stored in the register 18, and takes a value L when the rotation angle is 0° or 180°, and a value H when it is 90° or 270°. The signal BUFNUM takes a value L when the buffer memory to be subjected to the reading is the buffer memory #A (9), and a value H when it is the buffer memory #B (10). Other input signals are the read enable signal nRENAB that is supplied from the control circuit 20, and the clock signal CLK4 having a frequency that is ¼ of that of the video clock signal.

Figure 9:
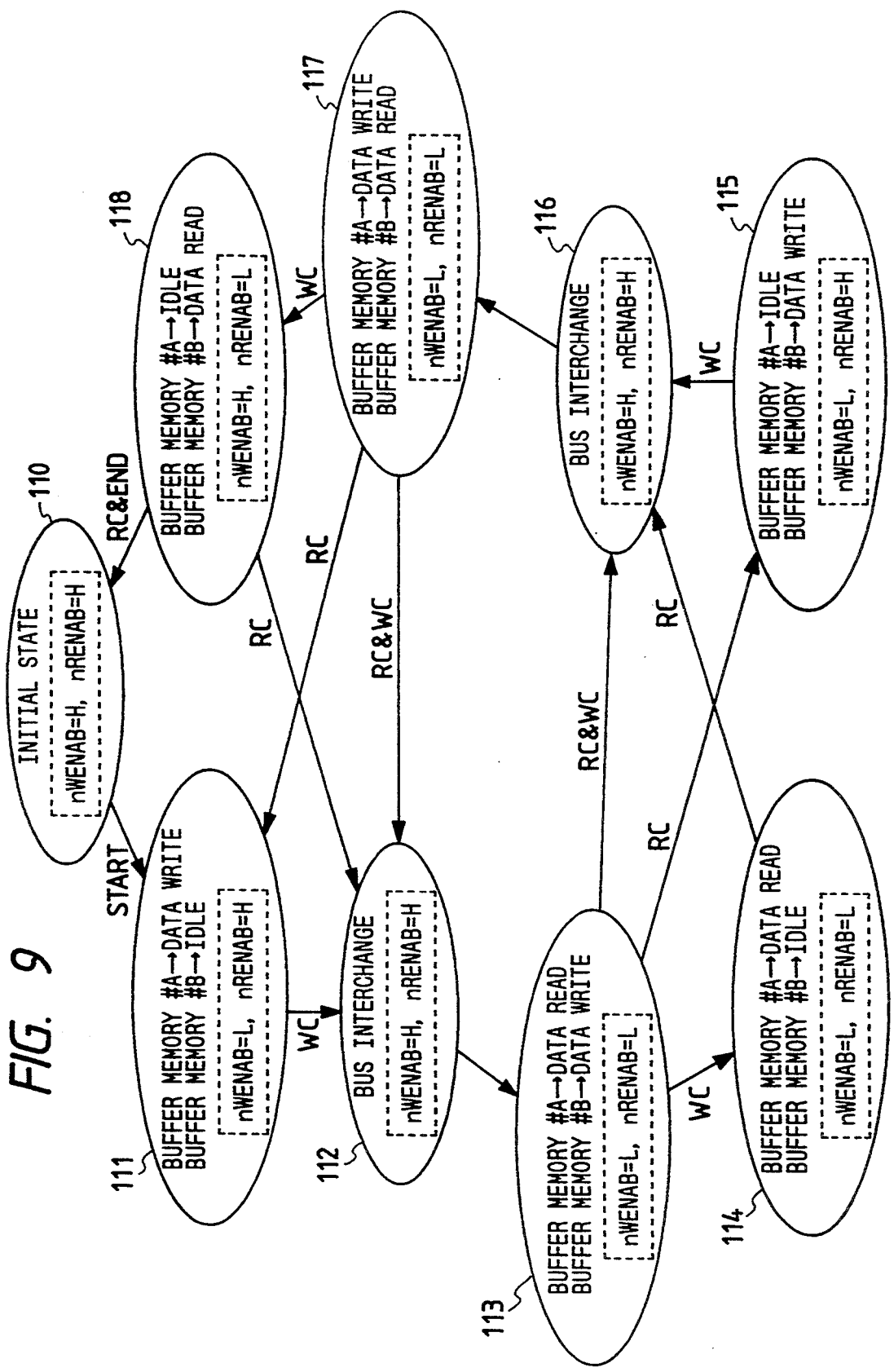
FIG. 9 is a state transition diagram showing image data write/read control of buffer memories.

FIG. 9 is a state transition diagram showing the image data write and read operations with the buffer memories.

State 110 is an initial state, in which both of the write enable signal nWENAB for controlling the buffer memory write address generation circuit 11 and the read enable signal nRENAB for controlling the buffer memory read address generation circuit 12 are negated to H. When a start signal START indicating the start of the rotation operation is thereafter asserted, transition is made to state 111.

In state 111, since the write enable signal nWENAB of the buffer memory write address generation circuit 11 is asserted to L, the buffer memory write address generation circuit 11 operates to write the image data of W/N lines to the buffer memory #A (9). The buffer memory 10 is in an idle state. The buffer memory write address generation circuit 11 generates write addresses of W/N lines and asserts the write completion signal WC of one clock. Thus, transition is made to state 112.

In state 112, both of the write enable signal nWENAB and the read enable signal nRENAB are negated to H. The multiplexer 5 performs switching so that the address is supplied from the buffer memory read address generation circuit 12 to the buffer memory #A (9), and the multiplexer 6 performs switching so that the address is supplied from the buffer memory write address generation circuit 11 to the buffer memory #B (10). Further, the multiplexer 4 performs switching so as to select the readout data from the buffer memory #A (9). Transition is made from state 112 to state 113.

In state 113, the data reading is effected with the buffer memory #A (9) and the data writing is effected with the buffer memory #B (10), and both of the write enable signal nWENAB and the read enable signal nRENAB are asserted to L. The buffer memory write address generation circuit 11, which has been activated by the assertion of the write enable signal nWENAB, generates write addresses of W/N lines and asserts the write completion signal WC of one clock. The buffer memory read address generation circuit 12, which has been activated by the assertion of the read enable signal nRENAB, generates read addresses of W/N lines and asserts the read completion signal RC of one clock. Transition is made from state 113 to state 114 when the assertion of the write completion signal WC is detected, to state 115 when the assertion of the read completion signal RC is detected, and to state 116 when the assertions of both of the write completion signal WC and the read completion signal RC are detected.

In state 114, data is read from the buffer memory #A (9) (nRENAB=L), and the buffer memory #B (10) is in an idle state. When the assertion of the read completion signal RC is detected, transition is made from state 114 to state 116.

In state 115, the buffer memory #A (9) is in an idle state and data is written to the buffer memory #B (10) (nWENAB =L). When the assertion of the write completion signal WC is detected, transition is made from state 115 to state 116.

In state 116, both of the write enable signal nWENAB and the read enable signal nRENAB are negated to H. The multiplexer 5 performs switching so that the address is supplied from the buffer memory write address generation circuit 11 to the buffer memory #A (9), and the multiplexer 6 performs switching so that the address is supplied from the buffer memory read address generation circuit 12 to the buffer memory #B (10). Further, the multiplexer 4 performs switching so as to select the readout data from the buffer memory #B (10). Transition is made from state 116 to state 117.

In state 117, data is written to the buffer memory #A (9) and data is read from the buffer memory #B (10). Both of the write enable signal nWENAB and the read enable signal nRENAB are asserted to L. Transition is made from state 117 to state 118 when the assertion of the write completion signal WC is detected, to state 111 when the assertion of the read completion signal RC is detected, and to state 112 when the assertions of both of the write completion signal WC and the read completion signal RC are detected.

In state 118, the buffer memory #A (9) is in an idle state and data is read from the buffer memory #B (10) (nRENAB =L). Transition is made from state 118 to state 112 when the assertion of the read completion signal RC is detected, to state 110 (initial state) when the assertions of both of the read completion signal RC and an all input image data read completion signal END are detected.

FIG. 10 illustrates in what order addresses are generated by the buffer memory write address generation circuit 11. In this case, addresses are generated in the same order for the buffer memories #A (9) and #B (10). In FIG. 10, an expression Y:X means a write address whose upper $\log_2(W/N)$ bits have a value Y and lower $\log_2(NF \times N/B)$ bits have a value X. First, a write address (W/N−1):(NF×N/B−1) is generated. Then, addresses are generated while decrement of one is performed NF×N/B−1 times. When an address (W/N−1): 0 is reached, the value of the upper $\log_2(W/N)$ bits is decremented by one and the value of the lower $\log_2(NF \times N/B-1)$ bits is returned to NF×N/B−1, to generate an address (W/N−2):(NF×N/B−1). Then, addresses are generated while decrement by one is again performed NF×N/B−1 times. Subsequently, addresses are generated in the similar manner as shown in FIG. 10. When an address 0:0 is generated, the write completion signal WC is asserted.

FIG. 11 illustrates in what order read addresses for the buffer memories are generated when the rotation angle is 0° or 180°. In this case, addresses are generated in the same order for the buffer memories #A (9) and #B (10). In FIG. 11, an expression Y:X means a read address whose upper $\log_2(W/N)$ bits have a value Y and lower $\log_2(NF \times N/B)$ bits have a value X. First, a read address (W/N−1):(NF×N/B−1) is generated. Then, addresses are generated while decrement of one is performed NF×N/B−1 times. When an address (W/N−1): 0 is reached, the value of the upper $\log_2(W/N)$ bits is decremented by one to generate an address (W/N−2):0. Then, increment of one is performed NF×N/B−1 times to reach an address (W/N−2):(NF×N/B−1). Subsequently, addresses are generated in the similar manner as shown in FIG. 11. When an address 0:0 is generated, the read completion signal WC is asserted.

Figure 12:
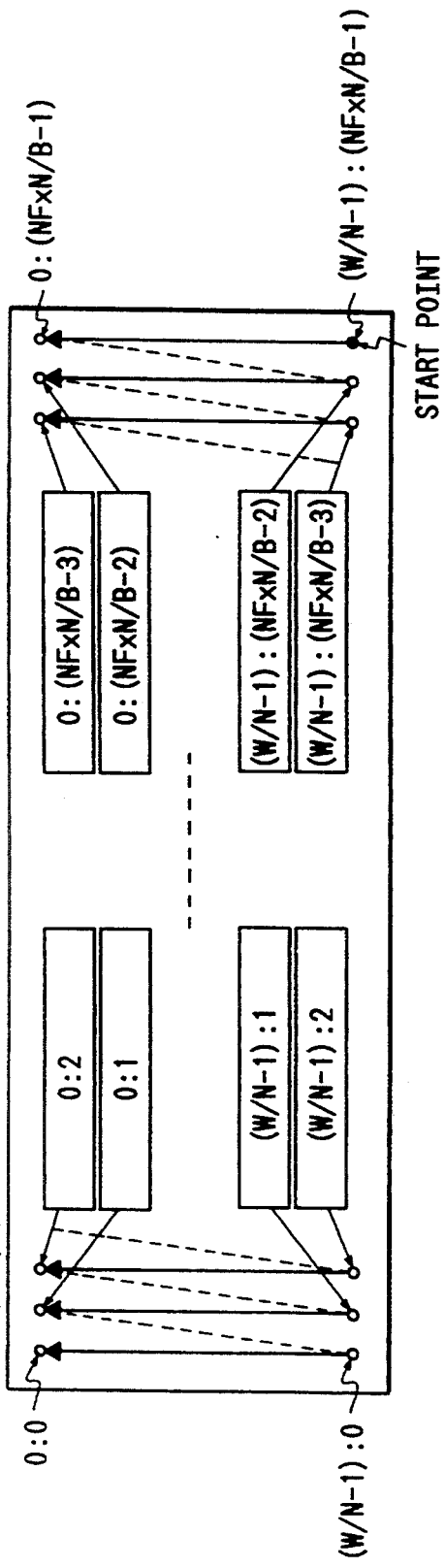
FIG. 12 illustrates an order in which read addresses for a buffer memory #A are generated by the buffer memory read address generation circuit for the rotation angle of 90° ccw or 270° ccw.

FIG. 12 illustrates in what order read addresses for the buffer memory #A (9) are generated when the rotation angle is 90° or 270°. In this case, first, a read address (W/N−1):(NF×N/B−1) is generated. Then, addresses are generated while the value of the upper $\log_2(W/N)$ bits is decremented by one W/N−1 times, to reach an address 0:(NF×N/B−1). Then, the value of the upper $\log_2(W/N)$ bits is returned to W/N−1 and the value of the lower $\log_2(NF \times N/B)$ bits is decremented by one, to generate an address (W/N−1):(NF×N/B−2). Subsequently, addresses are generated in the similar manner as shown in FIG. 12. When an address 0:0 is generated, the read completion signal RC is asserted.

Figure 13:
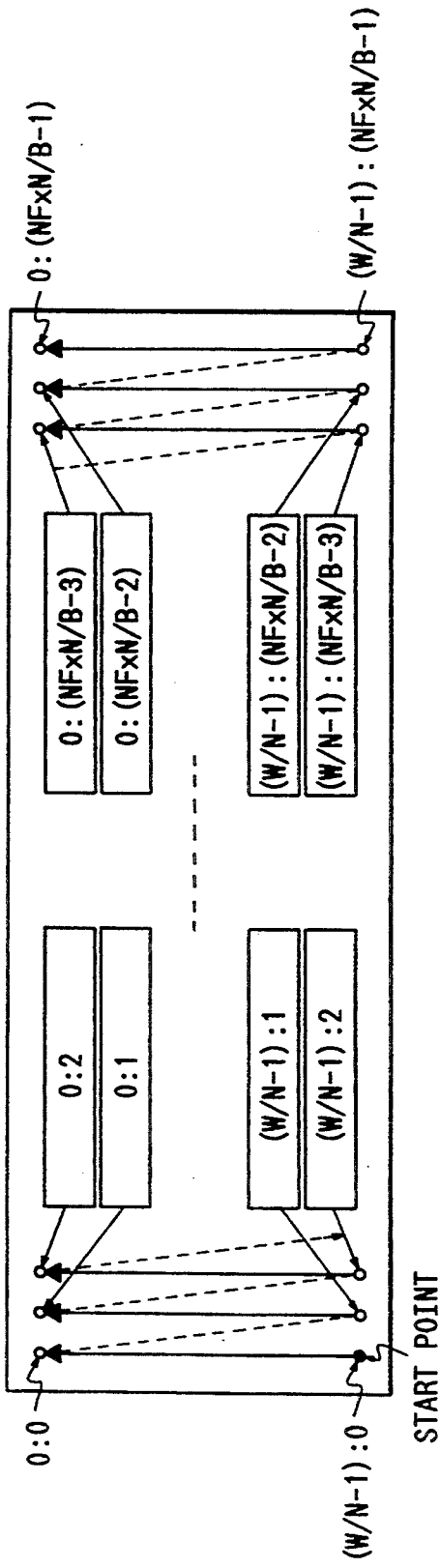
FIG. 13 illustrates an order in which read addresses for a buffer memory #B are generated by the buffer memory read address generation circuit for the rotation angle of 90° ccw or 270° ccw.

FIG. 13 illustrates in what order read addresses for the buffer memory #B (10) are generated when the rotation angle is 90° or 270°. In this case, first, a read address (W/N−1):0 is generated. Then, addresses are generated while the value of the upper $\log_2(W/N)$ bits is decremented by one W/N−1 times, to reach an address 0:0. Then, the value of the upper $\log_2(W/N)$ bits is returned to W/N−1 and the value of the lower $\log_2(NF \times N/B)$ bits is incremented by one, to generate an address 0:(NF×N/B−1). Then, the read completion signal RC is asserted.

The 4-bit image data read out from the buffer memory #A (9) or #B (10) in accordance with the read addresses generated by the buffer memory read address generation circuit 12 is forwarded to the word synthesizing circuit 13 while the image data of the read-side buffer memory is selected by the multiplexer 4.

Figure 14:
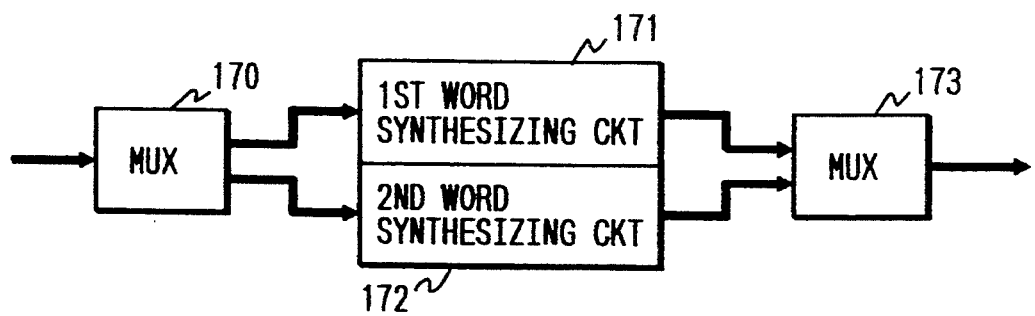
FIG. 14 a block diagram showing constitution of a word synthesizing circuit.

FIG. 14 shows details of the word synthesizing circuit 13. The 4-bit image data read out from the buffer memory and input to the word synthesizing circuit 13 is input to a multiplexer 170, which supplies the image signal to a first word synthesizing circuit 171 or a second word synthesizing circuit 172 in accordance with the number N of information bits of the input image data. Eight-bit word data synthesized by the selected one of the first and second word synthesizing circuits 171 and 172 is output while selected by a multiplexer 173.

Figure 15:
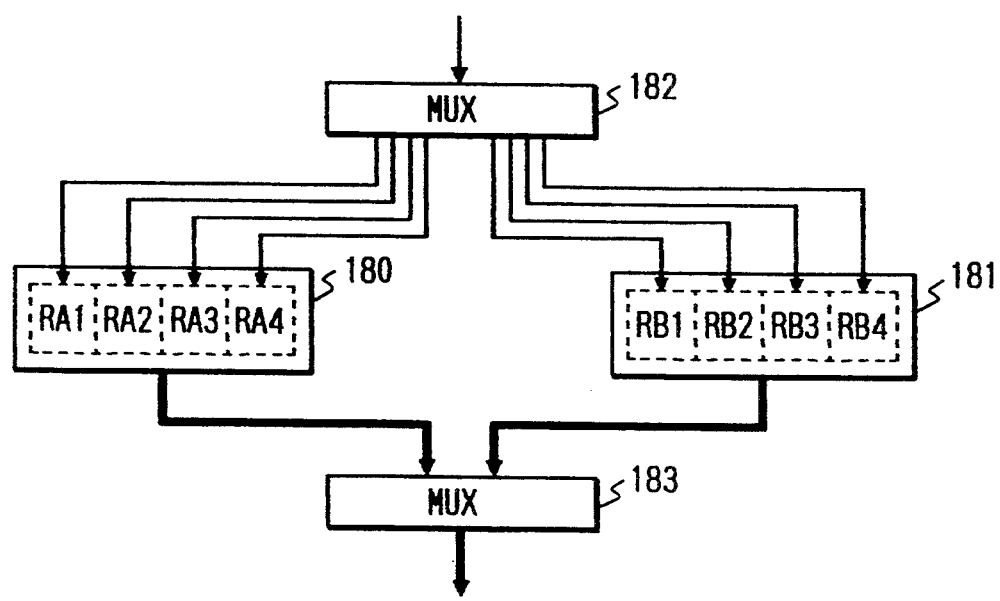
FIG. 15 is a block diagram showing constitution of first word synthesizing circuit.

FIG. 15 shows details of the first word synthesizing circuit 171 for the input image data of N (number of information bits)=2. A synthesizing register 180 is an 8-bit register consisting of four register modules RA1–RA4 with which write enable designation can be made on a 2-bit basis. Similarly, a synthesizing register 181 is an 8-bit register consisting of four register modules RB1–RB4 with which write enable designation can be made on a 2-bit basis. A multiplexer 182 divides the image data of two pixels that is input as a parallel 4-bit data into two 2-bit data of one pixel, and distributes the two data to the register modules of the synthesizing registers 180 and 181 in accordance with the rotation angle (described later) while performing write enable control of those register modules. When the image data has been set in both of the synthesizing registers 180 and 181, a multiplexer 183 first selects 8-bit word data from the synthesizing register 180 and then that from the synthesizing register 181.

Figure 16:
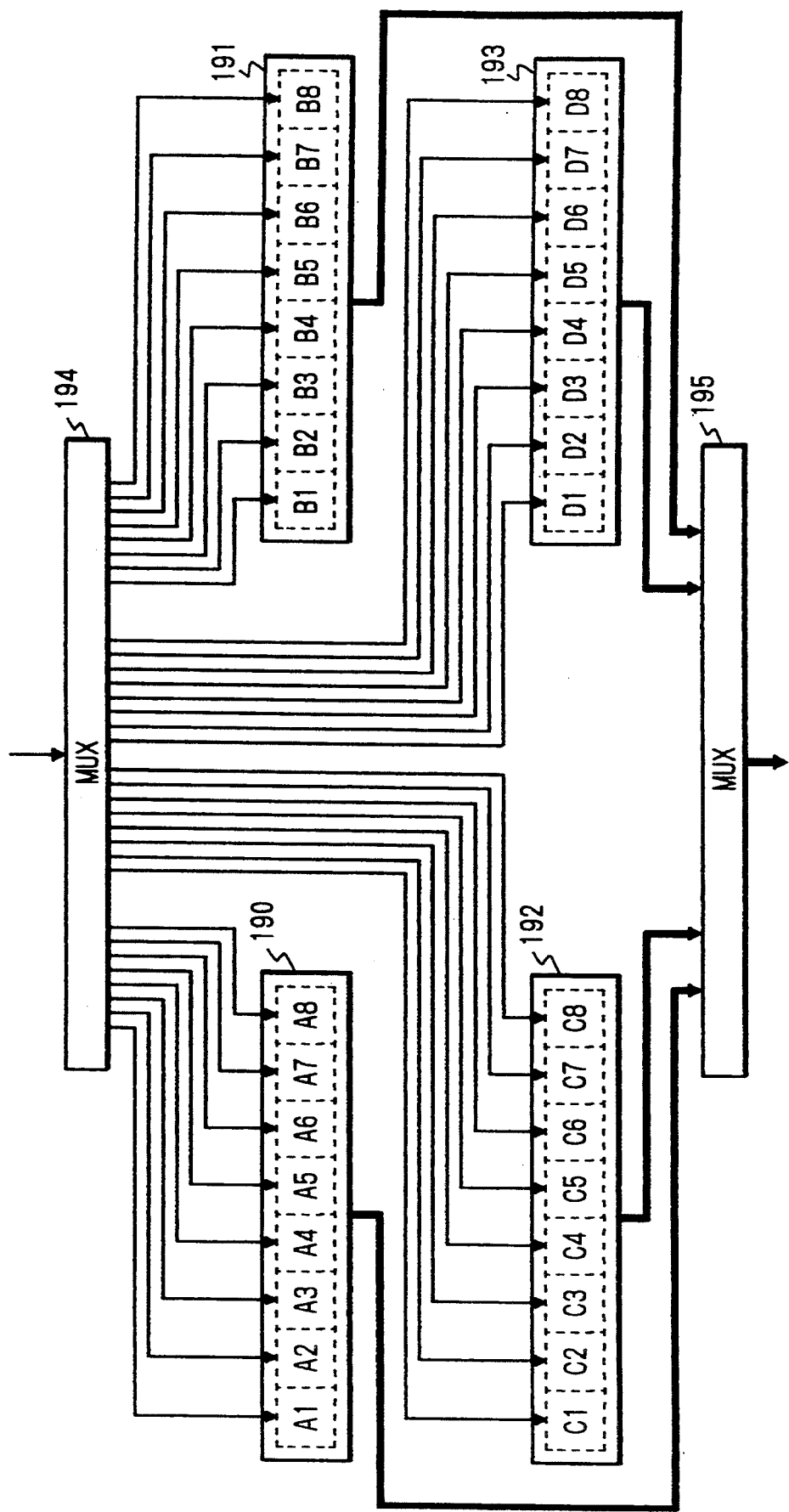
FIG. 16 is a block diagram showing constitution of a second word synthesizing circuit.

FIG. 16 shows details of the second word synthesizing circuit 172 for the input image data of N (number of information bits)=1. A synthesizing register 190 is an 8-bit register consisting of eight register modules A1–A8 with which write enable designation can be made on a 1-bit basis. A synthesizing register 191 is an 8-bit register consisting of eight register modules B1–B8 with which write enable designation can be made on a 1-bit basis. A synthesizing register 192 is an 8-bit register consisting of eight register modules C1–C8 with which write enable designation can be made on a 1-bit basis. A synthesizing register 193 is an 8-bit register consisting of eight register modules D1–D8 with which write enable designation can be made on a 1-bit basis. A multiplexer 194 divides the image data of four pixels that is input as a parallel 4-bit data into four 1-bit data of one pixel, and distributes the four data to the register modules of the synthesizing registers 190–193 in accordance with the rotation angle while performing write enable control of those register modules. When the image data has been set in all of register modules of the synthesizing registers 190–193, that is, when four 8-bit word data have been prepared, a multiplexer 195 sequentially selects 8-bit word data from the synthesizing registers 190–193 in this order.

As a modification, there may be used W-bit registers of B/NMIN (NMIN is the minimum of the number N of information bits of the input image data, and is one in this case) each consisting of register modules with which write enable designation can be made on a NMIN-bit basis, i.e., in accordance with N, and a multiplexer may be so constructed as to make N/NMIN of the above register modules in a write enable state. With this constitution, a word synthesizing circuit can be constructed which can accommodate different Ns with the use of W-bit registers of only B/NMIN.

FIGS. 17 and 18 show how control is made to set the image data in the first word synthesizing circuit 171. In this operation, four 4-bit image data read out from the buffer memory are input and two 8-bit word synthesizing registers 180 and 181 are fully supplied with data. This operation is repeated until all of the input image data is converted to 8-bit synthesized word data.

When the rotation angle is 0° or 180°, different control is performed for even lines and odd lines of the image data (the start line is assumed to be an odd line). Table 201 shows data control in the case where the rotation angle is 0° or 180° and odd-line data is to be processed. The two 2-bit data (two pixels) of the first 4-bit image data are represented by D0 and D1, where D0 represents the pixel of the upper bits, i.e., the first one of the two 2-bit data. When this 4-bit data is received, the data D0 and D1 are set in the respective register modules RA1 and RA2. Subsequent 4-bit image data D2 and D3, D4 and D5, and D6 and D7 are set in the register modules RA3 and RA4, RB1 and RB2, and RB3 and RB4, respectively.

Table 202 shows data control in the case where the rotation angle is 0° and 180° and even-line data is to be processed. Table 203 shows data control for the rotation angle of 90° counterclockwise, in which case the even-line data and the odd-line data are processed in the same manner. Table 204 shows the case of the rotation angle of 270° counterclockwise, in which case the even-line data and the odd-line data are processed in the same manner.

In an image data control operation of the second word synthesizing circuit 172, eight 4-bit image data read out from the buffer memory are input and four 8-bit word synthesizing registers 190–193 are fully supplied with data. This operation is repeated until all of the input image data is converted to 8-bit synthesized word data. Since a specific image data setting operation in this case can be understood from FIGS. 17 and 18, a description therefor is omitted here.

The page memory write address generation circuit 14 generates write addresses when the 8-bit word data synthesized by the word synthesizing circuit 13 is written to the page memory 16. The control circuit 20 sends, in an associated state, the image data and the addresses to the page memory interface 15, which performs handshake transfer etc. to write the data to the page memory 16.

FIG. 19 shows the page memory write address generation circuit 14. Prior to the start of the rotation operation, a base address of the page memory 16 set by the CPU 17 and stored in the register 18 is loaded into a 22-bit register 211. A width in the main scanning direction of the page memory 16, i.e., the number NW of words, which has been set by the CPU 17 and stored in the register 18, is input to a B-input of an ALU 210. On the other hand, an address stored in a register 211 is input to an A-input of the ALU 210. The ALU 210 performs calculations of A−1, A+1, A−B and A+B while being controlled by a control signal generated by the control circuit 20 in accordance with the rotation angle, and stores calculation results into the register 211.

Figure 20B:
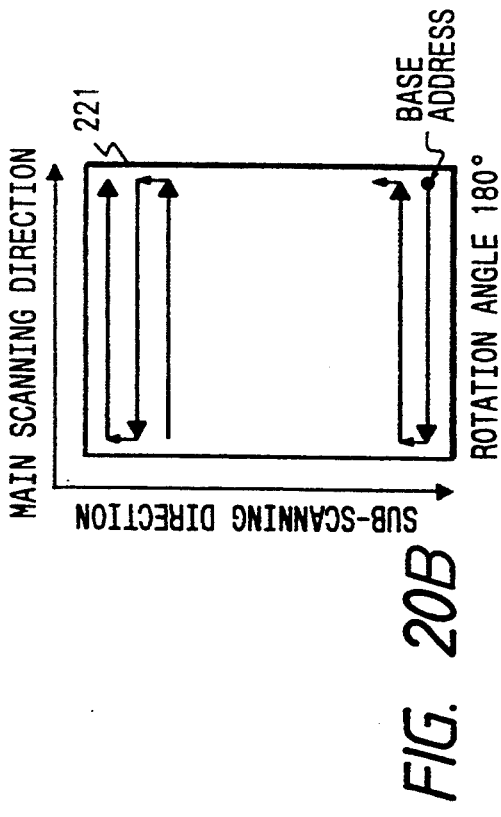
FIGS. 20A–20D illustrates an order in which write addresses are generated by the page memory write address generation circuit.
Figure 20D:
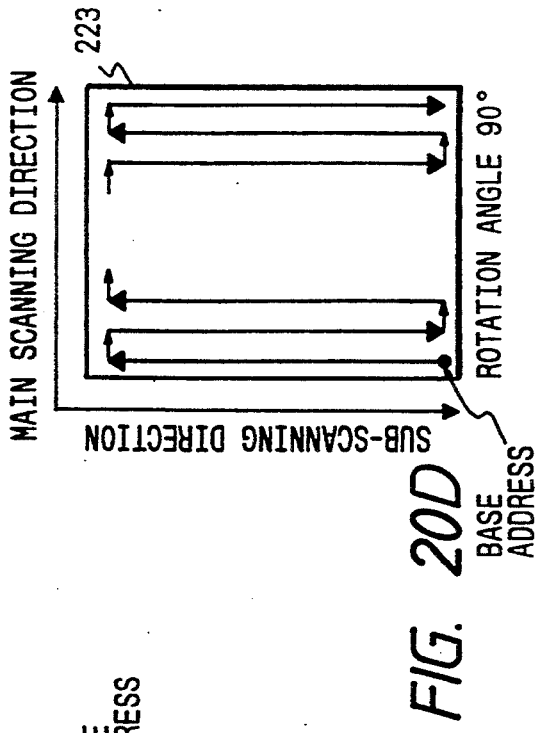
Figure 20A:
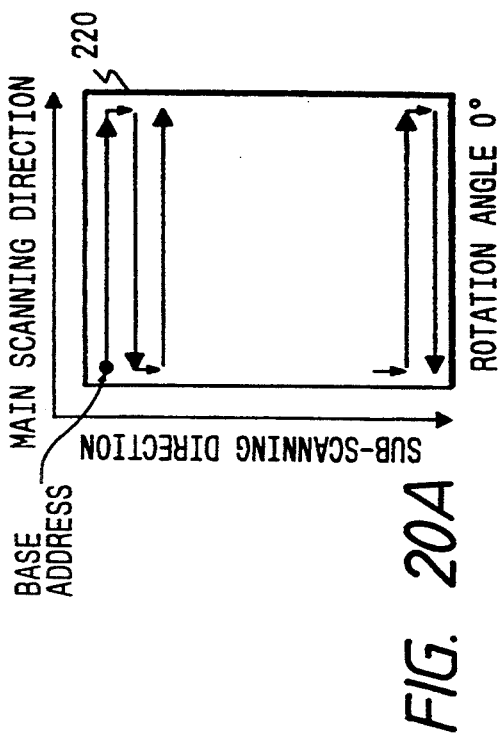
Figure 20C:
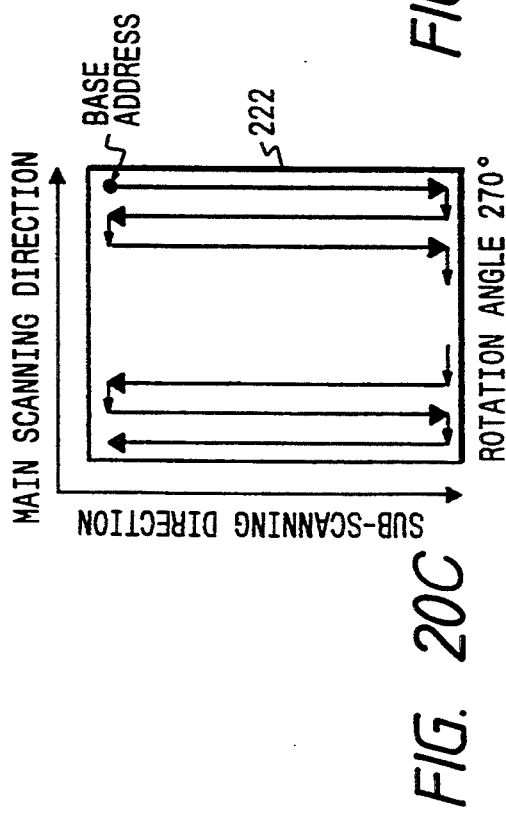

FIGS. 20A–20D illustrates in what order the page memory write address generation circuit 14 generates addresses. The base address is set by the CPU 17 and stored in the register 18 as an address to which word data including the first pixel data of the input image data is to be written. Referring to FIGS. 20A–20D, the ALU 210 is controlled to perform a calculation A+1 when the addresses are generated in the direction of the progress of the main scanning, and a calculation of A−1 when they are generated in the direction opposite to the progress of the main scanning. Further, the ALU 210 is controlled to perform a calculation of A+B when the addresses are generated in the direction of the progress of the sub-scanning, and a calculation of A−B when they are generated in the direction opposite to the progress of the sub-scanning. Diagram 220 in FIG. 20A illustrates an order in which the write addresses for the page memory 16 are generated in the case of the rotation angle of 0°. Diagram 221 in FIG. 20B illustrates an order in which the write addresses for the page memory 16 are generated in the case of the rotation angle of 180°. Diagram 222 in FIG. 20C illustrates an order in which the write addresses for the page memory 16 are generated in the case of the rotation angle of 270° counterclockwise. Diagram 223 in FIG. 20D illustrates an order in which the write addresses for the page memory 16 are generated in the case of the rotation angle of 90° counterclockwise.

With the above-described rotation operations, an image subjected to the rotation of a desired angle is stored in the page memory 16. Although the above embodiment is directed to the case where one pixel data of the image data takes two numbers of information bits, the invention is not limited to such a case but can be applied to the case where one pixel data takes more numbers of information bits.

Although in the above embodiment the generation of the read address for the buffer memories is controlled in accordance with the rotation angle, the invention is not limited such a case but can be applied to the cases where the generation of the write address or both of the read and write addresses is controlled in accordance with the rotation angle. Further, although in the above embodiment the generation of the address for the buffer memories is controlled using down counters and an up/down counter, the invention is not limited to such a case but can be applied to the case where it is controlled using up counters and an up/down counter.

As described above, according to the image rotation apparatus of the invention, since the write/read address control is performed for each B/N pixels by combining pixel data (N bits) of the input image data in accordance with the word length B of the buffer memories, only one kind of buffer memory is sufficient for the realtime rotation operation of the input image data of different numbers of information bits, that is, it is not necessary to use buffer memories for the respective numbers of information bits. By constructing the apparatus so that B/N becomes two or more, the data access to the buffer memory need not be performed at a rate of the video clock, which eliminates the need of using high-speed memory devices. Therefore, the circuits become compact and generate less heat, and the rotation processing speed is increased. Further, by switching the buffer memory address control operations and the operations of synthesizing the word data to be input to the page memory in accordance with the number of information bits of one pixel, the rotation operation can be performed without changing the constitution of the buffer memory.

What is claimed is:

1. An image rotation apparatus for rotating input image data of N bits per pixel by a specified rotation angle and storing the rotated image data to a page memory having a word length of W bits, said image rotation apparatus comprising:

a buffer memory having a word length of B bits, for storing the input image data of at least W/N lines;

memory control means for writing and reading the input image data to and from the buffer memory in an order in accordance with the specified rotation angle and an image size;

means for synthesizing B/N word data of W bits from W/N image data having a word length of B bits read by the memory control means so as to produce image data rotated by the specified rotation angle;

output control means for outputting the B/N synthesized word data of W bits in an order in accordance with the specified rotation angle; and means for generating write addresses for storage of the output word data into the page memory so that the input image data is stored into the page memory with a rotation of the specified rotation angle; where $N \leq B \leq W$, W mod B=0, and B mod N=0.

2. The image rotation apparatus of claim 1, wherein the synthesizing means synthesizes the B/N word data of W bits every time the memory control means reads the W/N image data having the word length of B bits.

3. The image rotation apparatus of claim 1, wherein the buffer memory comprises a plurality of memory sections each having a word length of B bits and serving to store the input image data of at least W/N lines, and the memory control means controls the buffer memory so that the plurality of memory sections operate as ping-pong buffers.

4. The image rotation apparatus of claim 3, wherein the memory control means writes the input image data to the buffer memory on a B/N-pixel basis.

5. The image rotation apparatus of claim 1, wherein the synthesizing means comprises at least B/N registers of W bits, and means for dividing the image data read by the memory control means and distributing the divided image data to the registers.

6. The image rotation apparatus of claim 1, further comprising means for specifying at least one of the rotation angle and the image size.

7. The image rotation apparatus of claim 1, further comprising means for reading an image to produce the input image data.

8. The image rotation apparatus of claim 1, further comprising means for switching operations of the memory control means, the synthesizing means, the output control means and the address generating means in accordance with the number N, wherein W and B are common multiples of a plurality of numbers that N can take.

9. The image rotation apparatus of claim 8, wherein the memory control means comprises an address counter including first and second counters, for designating an address of the buffer memory by combining counts of the first and second counters, and wherein the switching means switches a number of bits counted by the first and second counters in accordance with the number N.

10. The image rotation apparatus of claim 8, wherein the synthesizing means comprises B/NMIN registers of W bits where NMIN represents a minimum of numbers that N can take, and means for dividing the image data read by the memory control means and distributing the divided image data to the registers, and wherein the switching means switches a number of unit bits of the image data distribution in accordance with the number N.

11. The image rotation apparatus of claim 1, wherein the address generating means generates write addresses for adjacent word data including adjacent pixel data of the rotated image data.

12. The image rotation apparatus of claim 1, wherein address generating means generates a write address for second word data adjacent to first word data in a main scanning direction by adding one to or subtracting one from the address of the first word data, and a write address for second word data adjacent to first word data in a sub-scanning direction by adding NW to or subtracting NW from the address of the first word data where NW represents a number of words in the main scanning direction of the page memory.

13. The image rotation apparatus of claim 3, wherein when the specified rotation angle is 90° or 270°, the memory control means changes its control operation depending on the memory section used so that the address generating means generates addresses for word data including adjacent pixel data.

14. The image rotation apparatus of claim 1, wherein the address generating means generates write addresses for even lines of the input image data and write addresses for odd lines of the input image data in opposite directions.

* * * * *